(12) United States Patent
Dattathreya et al.

(10) Patent No.: US 8,112,323 B2
(45) Date of Patent: Feb. 7, 2012

(54) PROCUREMENT REQUISITION PROCESSING METHOD AND SYSTEM

(75) Inventors: Macam S. Dattathreya, Sterling Heights, MI (US); Russell Thomas White, Jr., Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 11/867,084

(22) Filed: Oct. 4, 2007

(65) Prior Publication Data
US 2009/0094130 A1   Apr. 9, 2009

(51) Int. Cl.
*G06Q 30/00* (2006.01)
(52) U.S. Cl. .................. 705/26.81; 707/607; 705/27.1
(58) Field of Classification Search ............... 705/26.81, 705/27.1; 707/607
See application file for complete search history.

(56) References Cited

U.S. PATENT DOCUMENTS

| | | | |
|---|---|---|---|
| 5,319,542 A * | 6/1994 | King et al. .................. | 705/26.81 |
| 6,820,076 B2 * | 11/2004 | Bailey et al. .................. | 707/770 |
| 7,082,408 B1 * | 7/2006 | Baumann et al. ............ | 705/26.8 |
| 7,720,714 B2 * | 5/2010 | Edwards ....................... | 705/26.2 |
| 2002/0065736 A1 * | 5/2002 | Willner et al. .................. | 705/26 |
| 2004/0128204 A1 * | 7/2004 | Cihla et al. ....................... | 705/26 |

OTHER PUBLICATIONS

Businesswire, ON Semiconductor Launches New Web Site to Better Address the Needs of Design Engineers and Purchasing Agents Worldwide, dated Oct. 25, 2005.*

* cited by examiner

*Primary Examiner* — Mark Fadok
(74) *Attorney, Agent, or Firm* — Schmeiser, Olsen & Watts; John R. Pivnichny

(57) ABSTRACT

A purchasing method and system. The method includes purchasing method comprising generating by said computing system a database table. The database table comprises catalog purchase types for items available for purchase. An entity profile associated with an entity is generated. The entity profile is associated with entity allowable catalog purchase types selected from the available catalog purchase types in the database table. A catalog profile is generated. The catalog profile is associated with the entity profile. A user profile associated with the entity profile is generated. The user profile is associated with the entity allowable catalog purchase types. Specified catalogs are identified and presented to a user. The user profile is comprised of a default purchase type and additional user related details. The specified catalogs are associated with the default purchase type, the user profile, the entity profile, and the catalog profile.

24 Claims, 7 Drawing Sheets

PROCUREMENT REQUISITION PROCESSING METHOD AND SYSTEM

FIELD OF THE INVENTION

The present invention relates to a method and associated system for configuring available purchase types for items available for purchase.

BACKGROUND OF THE INVENTION

Modifying a process for requesting items typically comprises a complicated and inefficient process with little flexibility. A user requesting items may not have the ability to associate the items with external factors. The user may be limited by an inability to modify the process. Accordingly, there exists a need in the art to overcome at least some of the deficiencies and limitations described herein above.

SUMMARY OF THE INVENTION

The present invention provides a purchasing method comprising:

enabling, by a computing system for an administrator, access to said computing system, wherein said computing system comprises a memory system, and wherein said administrator is associated with a first entity;

generating, by said computing system in response to a first command received from said administrator, a database table, wherein said database table comprises catalog purchase types for items available for purchase;

storing said database table in said memory system;

generating, by said computing system in response to a second command received from said administrator, an entity profile associated with said first entity;

associating, by said computing system in response to a third command received from said administrator, said entity profile with entity allowable catalog purchase types selected from said catalog purchase types in said database table;

generating, by said computing system in response to a fourth command received from said administrator, a catalog profile, said catalog profile comprising catalogs that comprise items that are associated with said catalog purchase types for said items available for purchase from said database table;

associating, by said computing system in response to a fifth command received from said administrator, said catalog profile with said entity profile;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile, and said catalog profile;

generating, by said computing system, a catalog report comprising said specified catalogs; and presenting, by said computing system to said first user, said catalog report for initiating a purchasing process.

The present invention provides a computing system comprising a processor coupled to a computer-readable memory unit, said memory unit comprising instructions that when executed by the processor implement a purchasing method, said method comprising:

enabling, by said computing system for an administrator, access to said computing system, wherein said administrator is associated with a first entity;

generating, by said computing system in response to a first command received from said administrator, a database table, wherein said database table comprises catalog purchase types for items available for purchase;

storing said database table in said computer-readable memory unit;

generating, by said computing system in response to a second command received from said administrator, an entity profile associated with said first entity;

associating, by said computing system in response to a third command received from said administrator, said entity profile with entity allowable catalog purchase types selected from said catalog purchase types in said database table;

generating, by said computing system in response to a fourth command received from said administrator, a catalog profile, said catalog profile comprising catalogs that comprise items that are associated with said catalog purchase types for said items available for purchase from said database table;

associating, by said computing system in response to a fifth command received from said administrator, said catalog profile with said entity profile;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile, and said catalog profile; and generating, by said computing system, a catalog report comprising said specified catalogs; and presenting, by said computing system to said first user, said catalog report for initiating a purchasing process.

The present invention provides a computer program product, comprising a computer readable medium comprising a computer readable program code embodied therein, said computer readable program code adapted to implement a purchasing method within a computing system, said method comprising:

enabling, by said computing system for an administrator, access to said computing system, wherein said administrator is associated with a first entity;

generating, by said computing system in response to a first command received from said administrator, a database table, wherein said database table comprises catalog purchase types for items available for purchase;

storing said database table in said computer readable medium;

generating, by said computing system in response to a second command received from said administrator, an entity profile associated with said first entity;

associating, by said computing system in response to a third command received from said administrator, said entity profile with entity allowable catalog purchase types selected from said catalog purchase types in said database table;

generating, by said computing system in response to a fourth command received from said administrator, a catalog profile, said catalog profile comprising catalogs that comprise items that are associated with said catalog purchase types for said items available for purchase from said database table;

associating, by said computing system in response to a fifth command received from said administrator, said catalog profile with said entity profile;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile, and said catalog profile; and generating, by said computing system, a catalog report comprising said specified catalogs; and presenting, by said computing system to said first user, said catalog report for initiating a purchasing process.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a purchasing method, said method comprising:

enabling, by said computing system for an administrator, access to said computing system, wherein said administrator is associated with a first entity;

generating, by said computing system in response to a first command received from said administrator, a database table, wherein said database table comprises catalog purchase types for items available for purchase;

storing said database table in said computing system;

generating, by said computing system in response to a second command received from said administrator, an entity profile associated with said first entity;

associating, by said computing system in response to a third command received from said administrator, said entity profile with entity allowable catalog purchase types selected from said catalog purchase types in said database table;

generating, by said computing system in response to a fourth command received from said administrator, a catalog profile, said catalog profile comprising catalogs that comprise items that are associated with said catalog purchase types for said items available for purchase from said database table;

associating, by said computing system in response to a fifth command received from said administrator, said catalog profile with said entity profile;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile, and said catalog profile; and generating, by said computing system, a catalog report comprising said specified catalogs; and presenting, by said computing system to said first user, said catalog report for initiating a purchasing process.

The present invention advantageously provides a simple method and associated system capable modifying a process for requesting items.

DETAILED DESCRIPTION OF THE INVENTION

Figure 1:
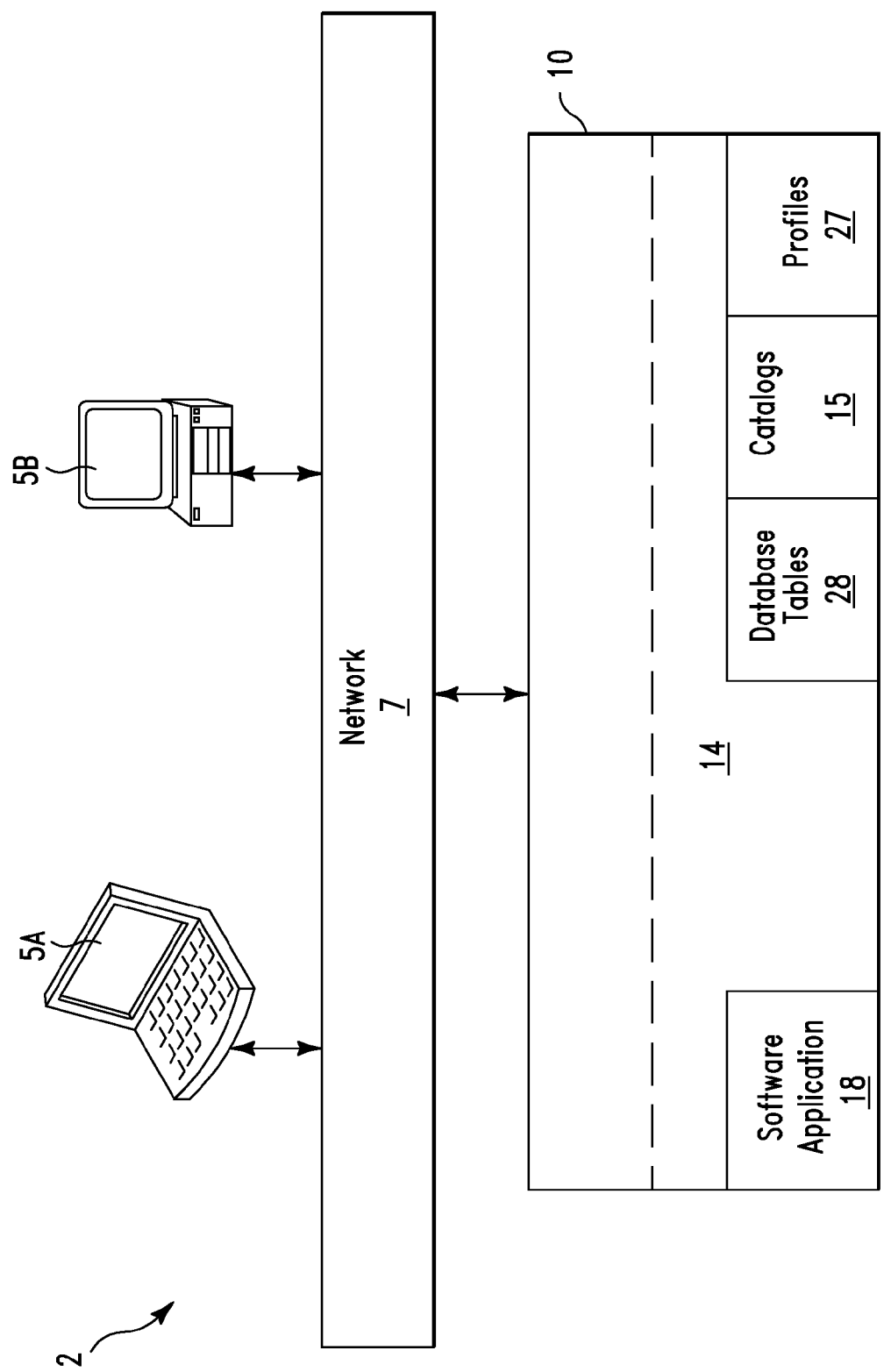
FIG. 1 illustrates a purchasing system for performing a procurement requisition process, in accordance with embodiments of the present invention.

FIG. 1 illustrates a purchasing system 2 for performing a procurement requisition process, in accordance with embodiments of the present invention. System 2 is used to:

1. To configure available purchase types (i.e., for items or merchandise available for purchase) for a procurement process.
2. Associate the available purchase types with procuring entities (e.g., companies) and hosted catalogs (i.e., comprising items or merchandise available for purchase) associated with the entities.
3. Associate requesters (i.e., users) choosing a purchasing type with catalogs (i.e., comprising the items or merchandise available for purchase).

System 2 comprises the following functionality for performing a procurement requisition process:

1. All available purchase types for items available for purchase are configurable and do not require additional software application (i.e., for software application 18) code changes every time a new purchase type is introduced.
2. Entity (e.g., company), user, and catalog profiles may be associated with newly added purchase types through a simple configuration process.
3. Based on a user's company and selected purchase type, a shopping process provides appropriate catalogs without modifying any software application code.
4. A purchasing type entity is available in the company, user, and catalog profiles so that any part of software application 18 (e.g. approvals, accounting, buyer assignment, etc) requiring a purchasing type may be modified easily based on a need.

Software application 18 generates and modifies the following profile types:

1. Entity/company profile—A profile for storing entity details such as entity name, entity address, purchasing options, etc.

2. Catalog profile—A profile for storing catalog details such as catalog name, catalog supplier, allowed entities for purchasing from a selected catalog etc.
3. User profile—A profile for storing user details such as user name, user address, user company, etc.

The above described profiles are used to identify associated (i.e., with an entity, and a user) for performing process. A purchasing process is defined herein as a process to allow users from a given company to purchase items offered by the catalogs.

System 2 of FIG. 1 comprises input/output (I/O) devices 5A and 5B connected to a computing system 10 through a network 7. I/O devices 5A and 5B may comprise any type of I/O device such as, inter alia, a notebook computer, a desktop computer, a personal digital assistant (PDA), etc. I/O devices 5A and 5B may be used by:

1. An administrator (e.g., a database administrator, a catalog administrator, an entity administrator, etc) for setting up or programming procurement requisition process.
2. A user (i.e., a requester) selecting items or merchandise available for purchase.

Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14. Memory system 14 comprises software application 18, profiles 27 (i.e., user, catalog, entity, etc), catalogs 15, and database tables 28. Software application 18 controls all functions related to:

1. Generating profiles 27.
2. Generating database tables 28.

System 2 is used to perform a procurement requisition process using the following steps:

1. A database table called "Purchase types" is generated and stored in memory system 14 (e.g., a database). The database table is used by software application 18. The database table is generated by a database administrator.
2. Predetermined purchase types are inserted into the database table. (i.e., by a database administrator).
3. An entity profile and a company profile are generated by an entity administrator.
4. The entity profile and the catalog profile graphical user interfaces (GUIs) are modified in order to allow administrators to specify allowable purchase types for the entities and catalogs. This step may be performed by an application developer.
5. A user (requester) profile is generated. The user profile comprises an owning entity specified allowed purchase types. This step may be performed by a user.
6. A catalog profile is generated. The catalog profile comprises allowable purchase types. This step may be performed by a catalog administrator.
7. The user profile GUI is modified in order to allow users to set default purchase types based on the user's owning company's or entity allowable purchase types. This step may be performed by an application developer.
8. Shopping process logic is modified in order to provide users with the appropriate catalogs (i.e., for purchasing) based on their owning company's and its pre authorized catalog's allowable purchase types. This step may be performed by a catalog administrator after the application developer modifies the application code logic.

The following description (steps) illustrates an example of implementation for performing a procurement requisition process:

1. A company (entity) administrator generates a company profile for a company code 001 and configures that users of the company code 001 may purchase catalogs meant for internal (INT) users or external (EXT) users.
2. A catalog administrator sets up a catalog profile 001 and configures that this catalog may be purchased only as internal (INT). The catalog administrator configures that this catalog may be purchased only by an entity 001.
3. A user X logins to software application 18 and his/her company is 001. The user selects a default purchase type as INT in his/her's user profile.
4. When the user logs into software application 18, system 2 checks that this user belongs to 001 and his/her default purchase type is INT.
5. Software application 18 queries memory system 14 for catalog purchase types and a catalog table with parameters comprising company code 001 and a purchase type of INT.
6. Since the catalog table and the catalog purchase types table have values for company code 001 and default purchase type INT, that catalog will be made available to the user X for purchasing items from it.

Figure 2:
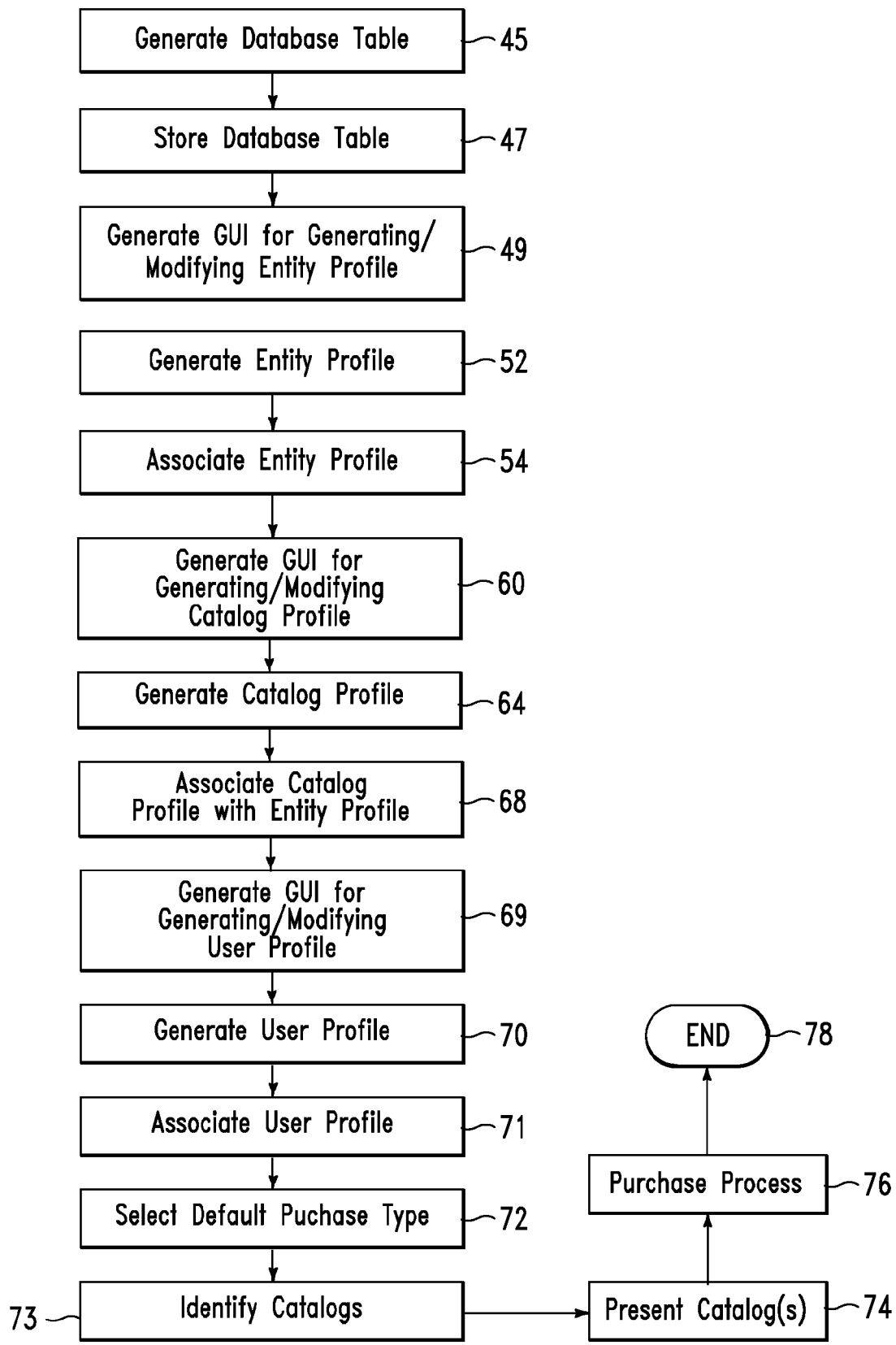
FIG. 2 illustrates a flowchart describing an algorithm used by the system of FIG. 1 for performing a procurement requisition process, in accordance with embodiments of the present invention.

FIG. 2 illustrates a flowchart describing an algorithm used by system 2 of FIG. 1 for performing a procurement requisition process, in accordance with embodiments of the present invention. In step 45, an administrator for an entity enables computing system 10 to generate a database table. The database table comprises catalog purchase types for items available for purchase. In step 47, the database table is stored in memory system 14 (see FIG. 1). In step 49, computing system 10 generates a graphical user interface (GUI) for enabling an administrator to generate and/or modify an entity profile. In step 52, computing system generates an entity profile associated with an entity. In step 54, computing system 10 associates the entity profile with entity allowable catalog purchase types selected from the available catalog purchase types in the database table. In step 60, computing system 10 generates a graphical user interface (GUI) for enabling an administrator to generate and/or modify a catalog profile. In step 64, computing system 10 generates a catalog profile. The catalog profile comprises catalogs that include items that are associated with the catalog purchase types for items available for purchase from the database table. In step 68, computing system 10 associates the catalog profile with the entity profile. In step 69, computing system 10 generates a graphical user interface (GUI) for enabling a user or requester to generate and/or modify a user profile. In step 70, computing system 10 generates a user profile. The user profile may comprise, inter alia, a name and address for a first user. In step 71, computing system 10 associates the user profile with the entity allowable catalog purchase types selected from the available catalog purchase types in the database table. In step 72, the user selects a default purchase type from the entity allowable catalog purchase types. In step 73, computing system 10 identifies specified catalogs from the catalogs based on the default purchase type, the user profile, the entity profile, and the catalog profile. In step 74, computing system 10 generates a catalog report comprising the specified catalogs identified in step 73. In step 74, the catalog report is presented to the user. In step 76, the user performs a purchasing process comprising executing purchases for items selected from catalogs from the catalog report and the process terminates in step 78.

Figure 3:
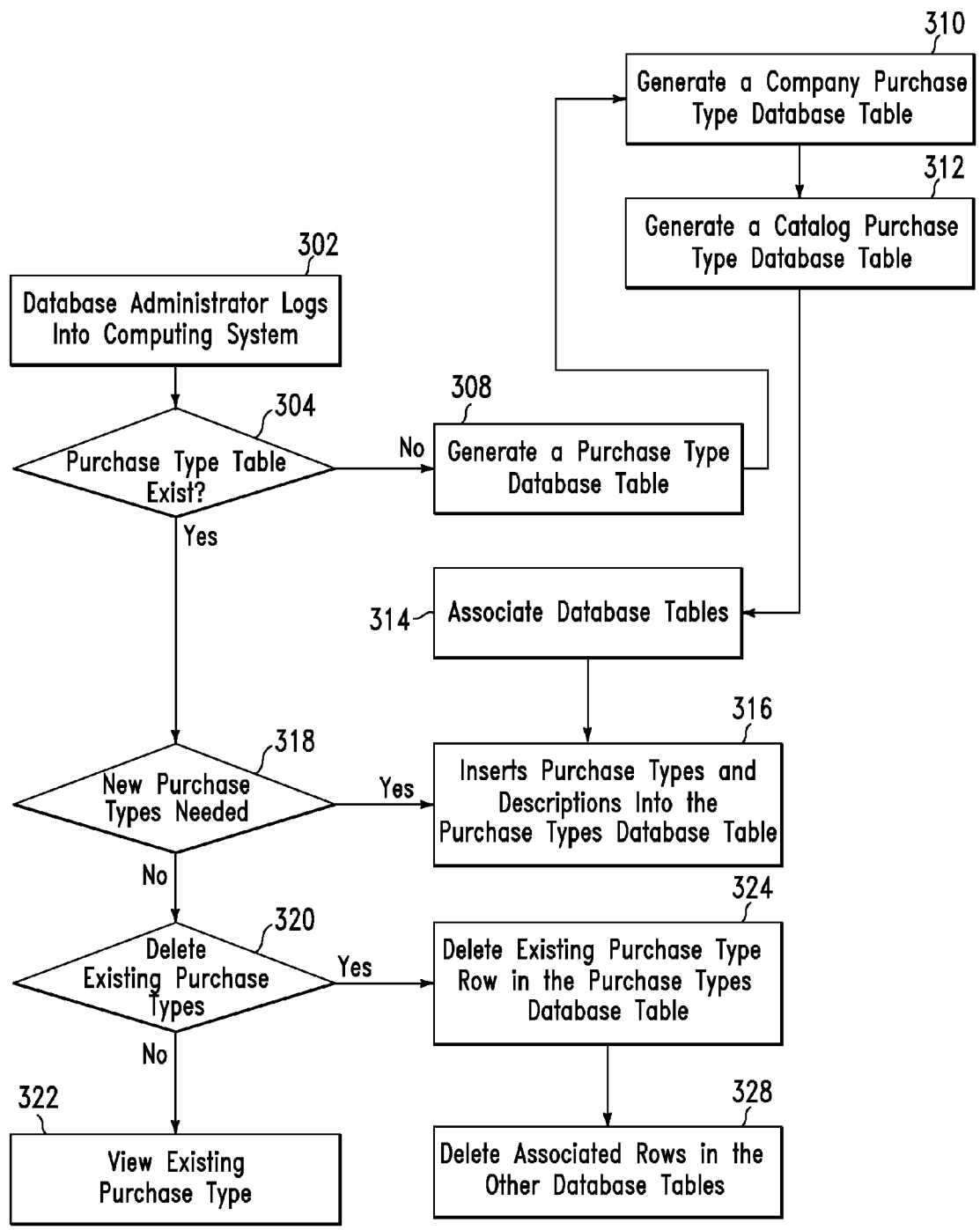
FIG. 3 illustrates a flowchart detailing a process for generating a database table(s), in accordance with embodiments of the present invention.

FIG. 3 illustrates a flowchart detailing steps 45 and 47 of FIG. 2 for generating a database table(s), in accordance with embodiments of the present invention. In step 302, a database administrator logs in to computing system 10. In step 304, the database administrator determines if a purchase type database table is available.

If in step 304, the database administrator determines that a purchase type database table is not available then in step 308, computing system 10 generates a purchase type database table in the database (i.e., memory device 14). The purchase type database table comprises two columns (a purchase type column and a purchase type description column) as illustrated in table 1:

TABLE 1

| Purchase type | Purchase Type description |
|---|---|
| INT | Internal purchase |
| EXT | External purchases |
| OUT | Outsourcing purchases |

In step 310, computing system 10 generates a company (entity) purchase type database table in the database (i.e., memory device 14). The company (entity) purchase type database table comprises two columns (a company code column and a purchase code column as illustrated in table 2:

TABLE 2

| Company Code | Purchase type code |
|---|---|
| 001 | INT |
| 001 | EXT |
| 002 | OUT |
| 002 | INT |

In step 312, computing system 10 generates a catalog purchase type database table in the database (i.e., memory device 14). The catalog purchase type database table comprises two columns (a catalog ID column and a purchase type column as illustrated in table 3:

TABLE 3

| Catalog ID | Purchase type code |
|---|---|
| 001A | INT |
| 001A | EXT |
| 002A | OUT |
| 002A | INT |

In step 314, the database administrator uses the database commands to associate the purchase type database table with the company (entity) purchase type database table and the catalog purchase type database table. The purchase type database table is designated as a parent table and the company (entity) purchase type database table and the catalog purchase type database table are each designated as a child table. Therefore a cascade delete option is enabled so that a deletion of rows in the parent table will automatically delete associated rows in the child tables. In step 316, the database administrator uses a database command to insert predetermined purchase types and descriptions into the purchase type database table.

If in step 304, the database administrator determines that a purchase type database table is available then in step 318 it is determined if additional purchase types are necessary. If in step 318, it is determined that additional purchase types are necessary then step 316 is executed as described, supra. If in step 318, it is determined that additional purchase types are not necessary then in step 320 is determined if existing purchase types should be deleted.

If in step 318, it is determined that existing purchase types should be deleted then in step 324, an existing purchase type row is deleted in the purchase type database table. In step 328, computing system 10 automatically deletes the associated rows in the company (entity) purchase type database table and the catalog purchase type database table.

If in step 318, it is determined that existing purchase types should not be deleted then in step 322, existing purchase types are presented for viewing.

Figure 4:
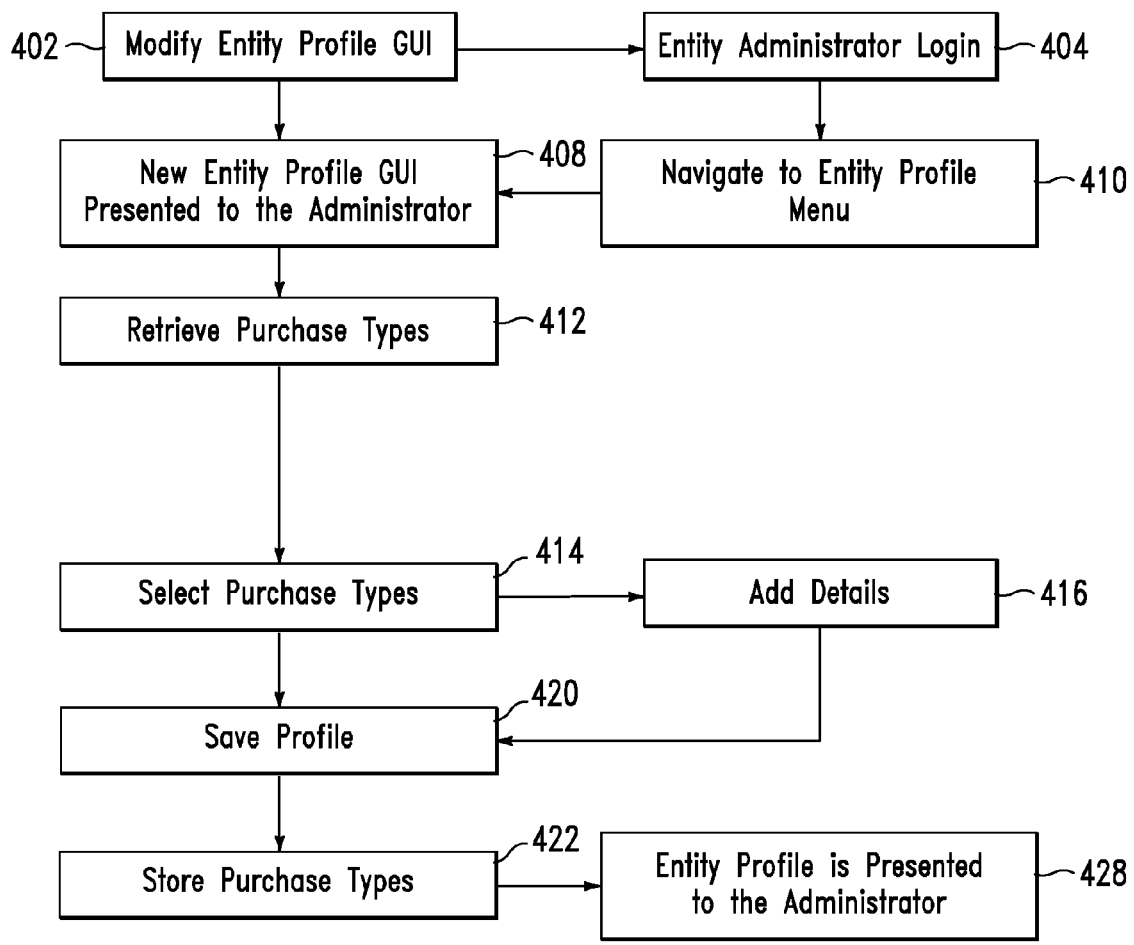
FIG. 4 illustrates a flowchart detailing a process for generating/modifying an entity profile, in accordance with embodiments of the present invention.

FIG. 4 illustrates a flowchart detailing steps 49, 52, and 54 of FIG. 2 for generating/modifying an entity profile, in accordance with embodiments of the present invention. System 2 comprises an entity profile GUI for setting up entity details. The entity profile GUI may be modified in order to have a drop down selection box for allowing entity administrators to select the allowable purchase types for the entity. The flowchart in FIG. 4 describes a workflow for an entity administrator to set up an entity profile and define the allowable purchase types based on the available purchase types defined in the purchase type database table.

In step 402, an entity profile GUI is modified (e.g., a code change performed by an application developer) in order to allow entity administrators to generate allowable purchase types for a given entity based on the pre-defined purchase types stored in the purchase type database table (e.g., see table 1). In step 404, an entity administrator logs into computing system 10. In step 410, the entity administrator navigates to an entity profile menu for configuring entity profiles. The entity administrator enables a create new entity profile menu item available under an entity configuration menu. In step 408, a create entity profile GUI screen is presented to the entity administrator. The GUI will have all details related to the entity along with a multi select drop down box to allow the entity administrator to choose allowable purchase types for the entity. While the create entity profile screen is being displayed, software application 18 will dynamically connect to memory system via database commands. In step 412, software application 18 retrieves all predefined purchase types from the purchase type database table and pre populates the allowable purchase types multi select drop down box on the create entity profile screen. In step 414, the entity administrator enables a control key (i.e., on a keyboard) and clicks desired purchase types available in the allowable purchase type drop down box. In step 416, the entity administrator fills in other details of the entity profile available in the create company profile screen. In step 420, the entity profile is saved. In step 422, the entity administrator selected purchase types in the allowable purchase type drop down box in the create entity profile screen are stored in the company purchase type table (i.e., see table 2). For example, when the entity administrator creates a new entity profile with an entity code of 001 and an entity name of xyz and allowable purchase types of INT, OUT, EXT, the entity purchase types data will be stored in the entity purchase types table as illustrated in table 2. In step 428, the entity profile is presented to the entity administrator.

Figure 5:
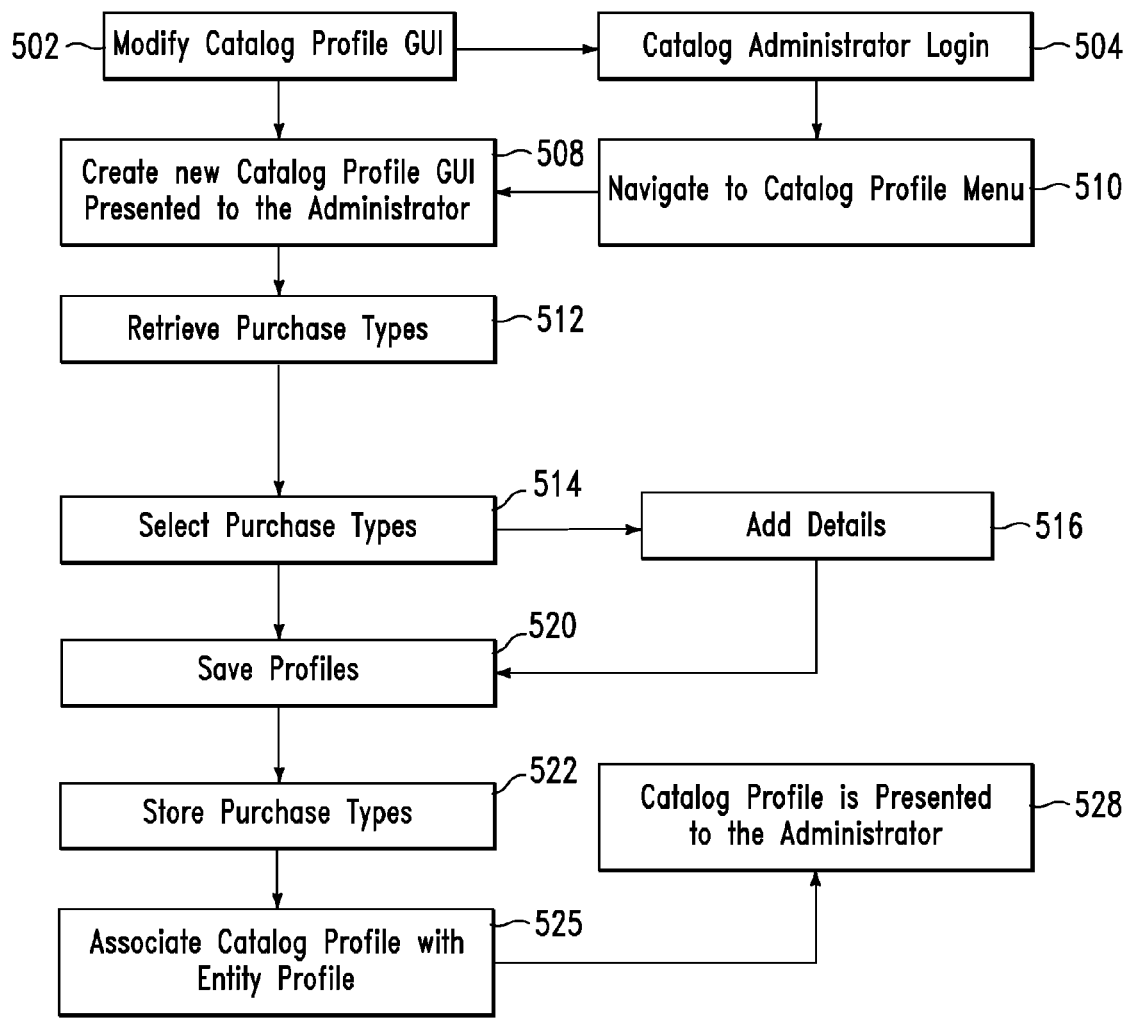
FIG. 5 illustrates a flowchart detailing a process for generating/modifying a catalog profile, in accordance with embodiments of the present invention.

FIG. 5 illustrates a flowchart detailing steps 60, 64, and 68 of FIG. 2 for generating/modifying a catalog profile, in accordance with embodiments of the present invention. System 2 comprises a catalog profile GUI for setting up catalog details. The catalog profile GUI may be modified in order to have a drop down selection box for allowing catalog administrators to select the allowable purchase types for the catalog. The flowchart in FIG. 5 describes a workflow for a catalog administrator to set up a catalog profile and define the allowable purchase types based on the available purchase types defined in the purchase type database table.

In step 502, a catalog profile GUI is modified (e.g., a code change performed by an application developer) in order to allow catalog administrators to generate allowable purchase types for a given catalog based on the pre-defined purchase types stored in the purchase type database table (e.g., see table 1). In step 504, a catalog administrator logs into computing system 10. In step 510, the catalog administrator navigates to a catalog profile menu for configuring catalog profiles. The catalog administrator enables a create new catalog profile menu item available under a catalog configuration menu. In step 508, a create catalog profile GUI screen is presented to the catalog administrator. The GUI will have all details related to the catalog along with a multi select drop down box to allow the catalog administrator to choose allowable purchase types for the catalog. While the create catalog profile screen is being displayed, software application 18 will dynamically connect to memory system via database commands. In step 512, software application 18 retrieves all pre-defined purchase types from the purchase type database table and pre populates the allowable purchase types multi select drop down box on the create catalog profile screen. In step 514, the catalog administrator enables a control key (i.e., on a keyboard) and clicks desired purchase types available in the allowable purchase type drop down box. In step 516, the catalog administrator fills in other details of the catalog profile available in the create company profile screen. In step 520, the catalog profile is saved. In step 522, the catalog administrator selected purchase types in the allowable purchase type drop down box in the create catalog profile screen are stored in the catalog purchase type table (i.e., see table 3). For example, when the catalog administrator creates a new catalog profile with a catalog code of 001 and a catalog name of xyz and allowable purchase types of INT, OUT, EXT, the catalog purchase type data will be stored in the catalog purchase types table as illustrated in table 3. In step 525, the catalog profile is associated with the entity profile. In step 528, the catalog profile is presented to the catalog administrator.

Figure 6:
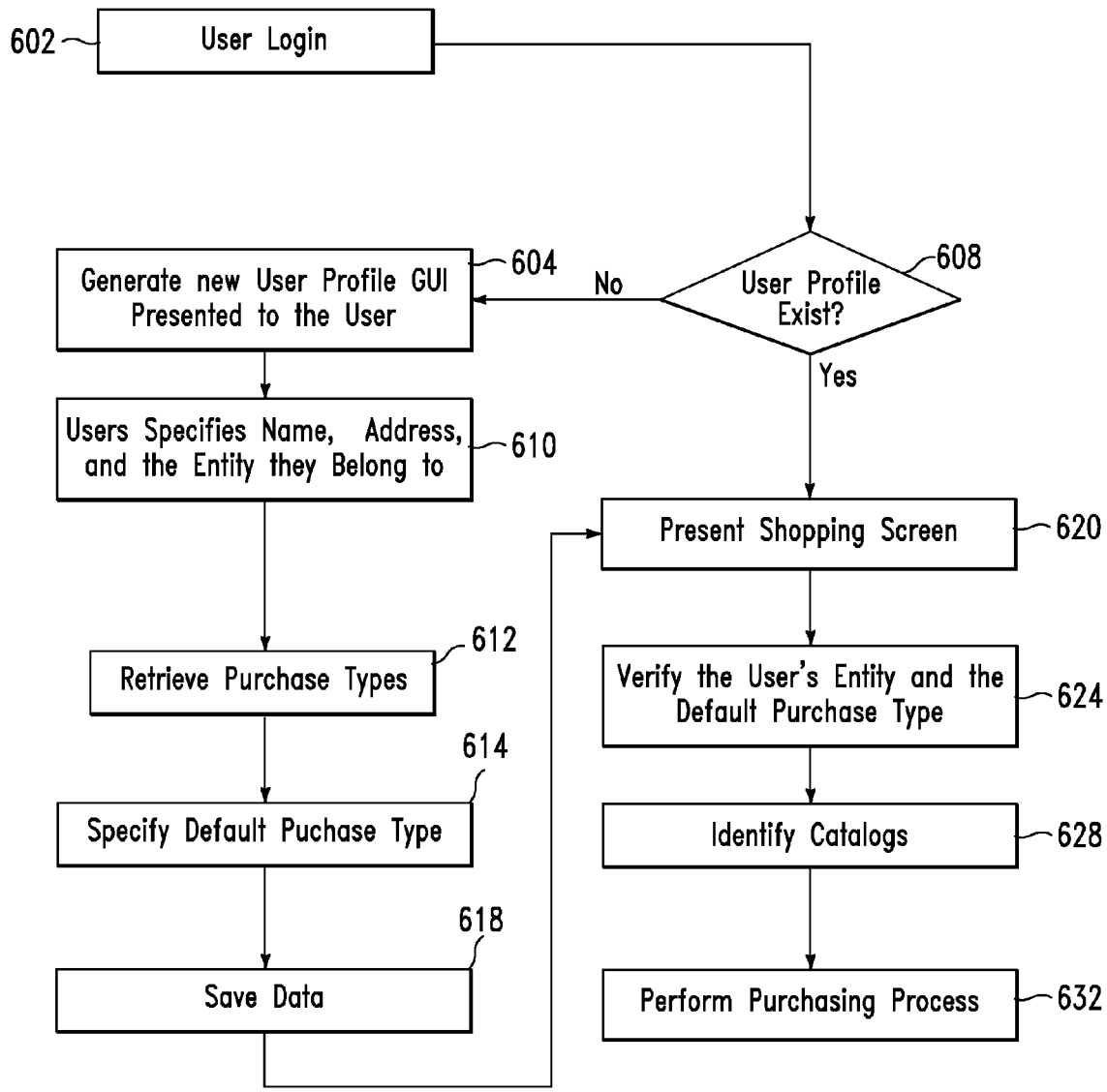
FIG. 6 illustrates a flowchart detailing a process for generating/modifying a user profile, in accordance with embodiments of the present invention.

FIG. 6 illustrates a flowchart detailing steps 69, 70, and 71-74 of FIG. 2 for generating/modifying a user profile, in accordance with embodiments of the present invention. In step 602, a user logs into computing system 10. In step 608, it is determined if a user profile exists.

If in step 608, it is determined that a user profile does not exists then in step 604, a create user profile GUI is displayed for the user. In step 610, the user will specify and enter details related to the user such as, inter alia, user name, user address, user entity. In step 612, software application 18 retrieves the entity purchase type database table and pre-populates default purchase types on the create user profile GUI. In step 614, the user selects desired default purchase types available from the default purchase types in the create user profile GUI. In step 618, the user profile is saved. In step 620, the user is presented with a catalog shopping screen. In step 624, software application 18 verifies the user's entity and default purchase type. In step 628, software application 18 identifies associated catalogs available to purchase based on the user's entity and the default purchase type set on the user's profile. In step 632, the user performs a purchasing process in order to purchase items.

Figure 7:
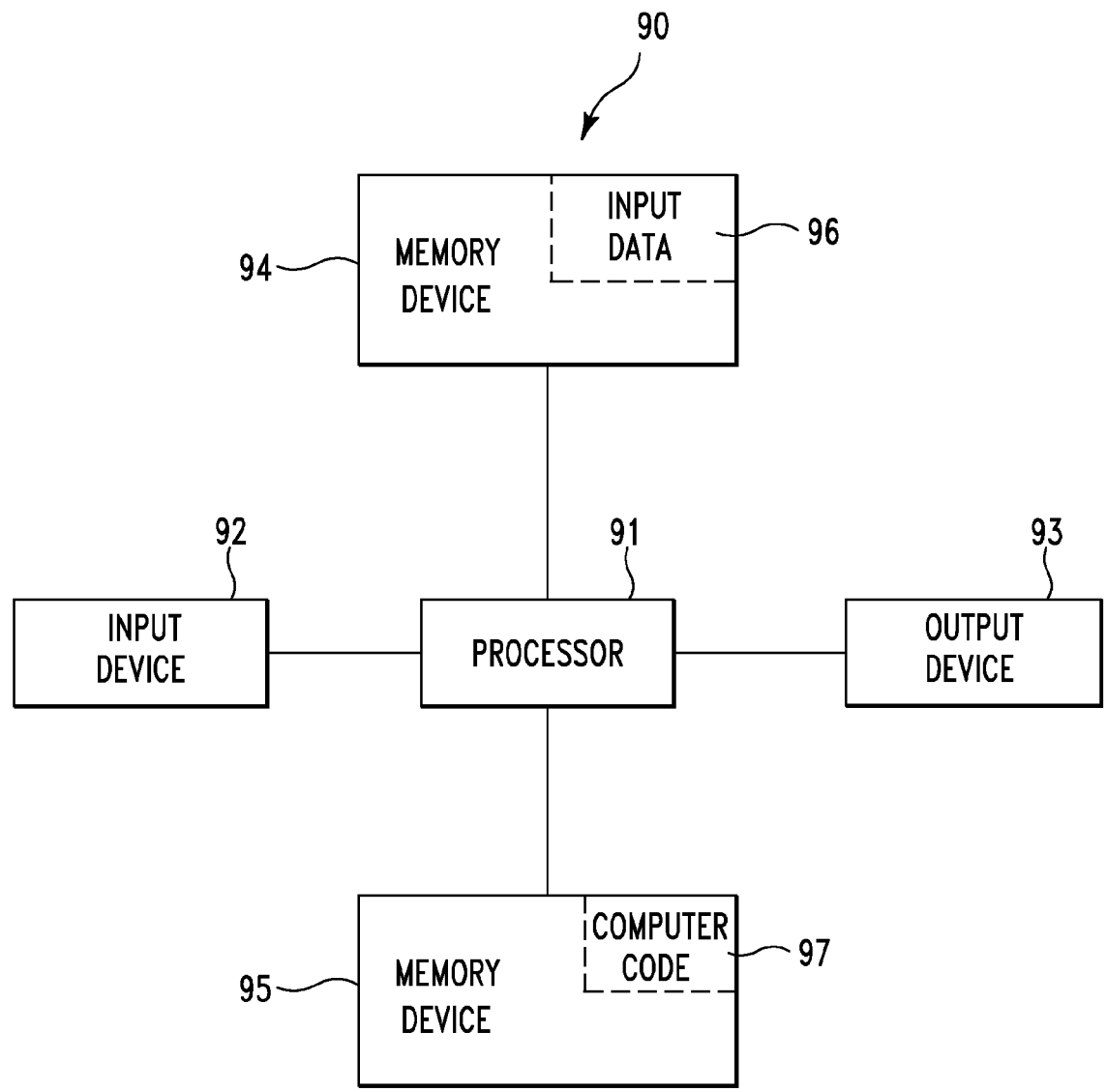
FIG. 7 illustrates a computer apparatus used for performing a procurement requisition process, in accordance with embodiments of the present invention.

FIG. 7 illustrates a computer apparatus 90 (e.g., computing system 10 of FIG. 1) used for performing a procurement requisition process, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-6) for performing a procurement requisition process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithms of FIGS. 2-6 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to perform a procurement requisition process. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for performing a procurement requisition process. In another embodiment, the invention provides a business method that performs the process steps of the invention on a subscription, advertising, and/or fee basis. That is, a service provider, such as a Solution Integrator, could offer to perform a procurement requisition process. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A purchasing method comprising:
   enabling, by a computing system for an administrator, access to said computing system, wherein said computing system comprises a memory system, and wherein said administrator is associated with a first entity;

generating, by said computing system in response to a first command received from said administrator, a database table, wherein said database table comprises catalog purchase types and associated descriptions for items available for purchase, and wherein said catalog purchase types are associated with internal entity purchases, external entity purchases, and outsourcing entity purchases;

storing said database table in said memory system;

generating, by said computing system in response to a second command received from said administrator, an entity profile table associated with said first entity, wherein said entity profile table comprises company code column and an allowable purchase type code column;

associating, by said computing system in response to a third command received from said administrator, said entity profile table with entity allowable catalog purchase types selected from said catalog purchase types in said database table;

generating, by said computing system in response to a fourth command received from said administrator, a catalog profile table, said catalog profile table comprising catalogs that comprise items that are associated with said catalog purchase types for said items available for purchase from said database table, wherein said catalog profile table comprises a catalog ID column and a purchase type column;

associating, by said computing system in response to a fifth command received from said administrator, said catalog profile with said entity profile;

generating, by said computing system, a cascade delete option allowing a deletion of rows in said database table to automatically delete associated rows in said entity profile table and said catalog profile table;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile table, and said catalog profile table;

generating, by said computing system, a catalog report comprising said specified catalogs; and presenting, by said computing system to said first user, said catalog report for initiating a purchasing process.

2. The method of claim 1, further comprising:
adding, by said computing system in response to a sixth command received from said administrator, new catalog purchase types to said database table.

3. The method of claim 1, further comprising:
deleting, by said computing system in response to a sixth command received from said administrator, at least one of said catalog purchase types from said database table.

4. The method of claim 1, further comprising:
generating, by said computing system in response to a sixth command received from said administrator, a first graphical user interface, said first graphical user interface used by said administrator to input data used for generating said entity profile.

5. The method of claim 1, further comprising:
generating, by said computing system in response to a sixth command received from said administrator, a first graphical user interface, said first graphical user interface used by said administrator to input data used for generating said catalog profile.

6. The method of claim 1, further comprising:
generating, by said computing system, a first graphical user interface, said first graphical user interface used by said user to input data used for generating said user profile.

7. A computing system comprising a processor coupled to a computer-readable memory unit, said memory unit comprising instructions that when executed by the processor implement a purchasing method, said method comprising:

enabling, by said computing system for an administrator, access to said computing system, wherein said administrator is associated with a first entity;

generating, by said computing system in response to a first command received from said administrator, a database table, wherein said database table comprises catalog purchase types and associated descriptions for items available for purchase, and wherein said catalog purchase types are associated with internal entity purchases, external entity purchases, and outsourcing entity purchases;

storing said database table in said computer-readable memory unit;

generating, by said computing system in response to a second command received from said administrator, an entity profile table associated with said first entity, wherein said entity profile table comprises company code column and an allowable purchase type code column;

associating, by said computing system in response to a third command received from said administrator, said entity profile table with entity allowable catalog purchase types selected from said catalog purchase types in said database table;

generating, by said computing system in response to a fourth command received from said administrator, a catalog profile table, said catalog profile table comprising catalogs that comprise items that are associated with said catalog purchase types for said items available for purchase from said database table, wherein said catalog profile table comprises a catalog ID column and a purchase type column;

associating, by said computing system in response to a fifth command received from said administrator, said catalog profile with said entity profile;

generating, by said computing system, a cascade delete option allowing a deletion of rows in said database table to automatically delete associated rows in said entity profile table and said catalog profile table;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile table, and said catalog profile table;

generating, by said computing system, a catalog report comprising said specified catalogs; and presenting, by said computing system to said first user, said catalog report for initiating a purchasing process.

8. The computing system of claim 7, wherein said method further comprises:

adding, by said computing system in response to a sixth command received from said administrator, new catalog purchase types to said database table.

9. The computing system of claim 7, wherein said method further comprises:

deleting, by said computing system in response to a sixth command received from said administrator, at least one of said catalog purchase types from said database table.

10. The computing system of claim 7, wherein said method further comprises:

generating, by said computing system in response to a sixth command received from said administrator, a first graphical user interface, said first graphical user interface used by said administrator to input data used for generating said entity profile.

11. The computing system of claim 7, wherein said method further comprises:

generating, by said computing system in response to a sixth command received from said administrator, a first graphical user interface, said first graphical user interface used by said administrator to input data used for generating said catalog profile.

12. The computing system of claim 7, wherein said method further comprises:

generating, by said computing system, a first graphical user interface, said first graphical user interface used by said user to input data used for generating said user profile.

13. A computer program product, comprising a computer readable medium comprising a computer readable program code embodied therein, said computer readable program code adapted to implement a purchasing method within a computing system, said method comprising:

enabling, by said computing system for an administrator, access to said computing system, wherein said administrator is associated with a first entity;

generating, by said computing system in response to a first command received from said administrator, a database table, wherein said database table comprises catalog purchase types and associated descriptions for items available for purchase, and wherein said catalog purchase types are associated with internal entity purchases, external entity purchases, and outsourcing entity purchases;

storing said database table in said computer readable medium;

generating, by said computing system in response to a second command received from said administrator, an entity profile table associated with said first entity, wherein said entity profile table comprises company code column and an allowable purchase type code column;

associating, by said computing system in response to a third command received from said administrator, said entity profile table with entity allowable catalog purchase types selected from said catalog purchase types in said database table;

generating, by said computing system in response to a fourth command received from said administrator, a catalog profile table, said catalog profile table comprising catalogs that comprise items that are associated with said catalog purchase types for said items available for purchase from said database table, wherein said catalog profile table comprises a catalog ID column and a purchase type column;

associating, by said computing system in response to a fifth command received from said administrator, said catalog profile with said entity profile;

generating, by said computing system, a cascade delete option allowing a deletion of rows in said database table to automatically delete associated rows in said entity profile table and said catalog profile table;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile table, and said catalog profile table;

generating, by said computing system, a catalog report comprising said specified catalogs; and presenting, by said computing system to said first user, said catalog report for initiating a purchasing process.

14. The computer program product of claim 13, wherein said method further comprises:

adding, by said computing system in response to a sixth command received from said administrator, new catalog purchase types to said database table.

15. The computer program product of claim 13, wherein said method further comprises:

deleting, by said computing system in response to a sixth command received from said administrator, at least one of said catalog purchase types from said database table.

16. The computer program product of claim 13, wherein said method further comprises:

generating, by said computing system in response to a sixth command received from said administrator, a first graphical user interface, said first graphical user interface used by said administrator to input data used for generating said entity profile.

17. The computer program product of claim 13, wherein said method further comprises:

generating, by said computing system in response to a sixth command received from said administrator, a first graphical user interface, said first graphical user interface used by said administrator to input data used for generating said catalog profile.

18. The computer program product of claim 13, wherein said method further comprises:

generating, by said computing system, a first graphical user interface, said first graphical user interface used by said user to input data used for generating said user profile.

19. A process for supporting computer infrastructure, said process comprising providing at least one support service for at least one of creating, integrating, hosting, maintaining, and deploying computer-readable code in a computing system, wherein the code in combination with the computing system is capable of performing a purchasing method, said method comprising:

enabling, by said computing system for an administrator, access to said computing system, wherein said administrator is associated with a first entity;

generating, by said computing system in response to a first command received from said administrator, a database table, wherein said database table comprises catalog purchase types and associated descriptions for items available for purchase, and wherein said catalog purchase types are associated with internal entity purchases, external entity purchases, and outsourcing entity purchases;

storing said database table in said computing system;

generating, by said computing system in response to a second command received from said administrator, an entity profile table associated with said first entity, wherein said entity profile table comprises company code column and an allowable purchase type code column;

associating, by said computing system in response to a third command received from said administrator, said entity profile table with entity allowable catalog purchase types selected from said catalog purchase types in said database table;

generating, by said computing system in response to a fourth command received from said administrator, a catalog profile table, said catalog profile table comprising catalogs that comprise items that are associated with said catalog purchase types for said items available for purchase from said database table, wherein said catalog profile table comprises a catalog ID column and a purchase type column;

associating, by said computing system in response to a fifth command received from said administrator, said catalog profile with said entity profile;

generating, by said computing system, a cascade delete option allowing a deletion of rows in said database table to automatically delete associated rows in said entity profile table and said catalog profile table;

generating, by said computing system in response to a first command received from a first user associated with said entity, a user profile for said first user, said user profile comprising a name and address for said first user;

associating, by said computing system, said user profile with said entity allowable catalog purchase types;

receiving from said first user, a selection for a default purchase type from said entity allowable catalog purchase types;

identifying, by said computing system, specified catalogs from said catalogs based on said default purchase type, said user profile, said entity profile table, and said catalog profile table;

generating, by said computing system, a catalog report comprising said specified catalogs; and presenting, by said computing system to said first user, said catalog report for initiating a purchasing process.

20. The process of claim 19, wherein said method further comprises:
adding, by said computing system in response to a sixth command received from said administrator, new catalog purchase types to said database table.

21. The process of claim 19, wherein said method further comprises:
deleting, by said computing system in response to a sixth command received from said administrator, at least one of said catalog purchase types from said database table.

22. The process of claim 19, wherein said method further comprises:
generating, by said computing system in response to a sixth command received from said administrator, a first graphical user interface, said first graphical user interface used by said administrator to input data used for generating said entity profile.

23. The process of claim 19, wherein said method further comprises:
generating, by said computing system in response to a sixth command received from said administrator, a first graphical user interface, said first graphical user interface used by said administrator to input data used for generating said catalog profile.

24. The process of claim 19, wherein said method further comprises:
generating, by said computing system, a first graphical user interface, said first graphical user interface used by said user to input data used for generating said user profile.

* * * * *